US007483405B2

(12) United States Patent
Emond et al.

(10) Patent No.: US 7,483,405 B2
(45) Date of Patent: Jan. 27, 2009

(54) METHOD AND SYSTEM FOR EMULATING A WIRELESS NETWORK

(75) Inventors: Germain Emond, Boucherville (CA); Yvon Bergeron, Varenne (CA); Richard Girardin, St-Basile-le-Grand (CA); Steve Hamel, Delson (CA)

(73) Assignee: Radio IP Software, Inc., Montreal, Quebec (CA)

( * ) Notice: Subject to any disclaimer, the term of this patent is extended or adjusted under 35 U.S.C. 154(b) by 1045 days.

(21) Appl. No.: 10/776,296

(22) Filed: Feb. 11, 2004

(65) Prior Publication Data
US 2005/0174986 A1   Aug. 11, 2005

(51) Int. Cl.
  *H04Q 7/00*   (2006.01)
(52) U.S. Cl. ............... 370/328; 370/401; 455/426.2
(58) Field of Classification Search .............. None
  See application file for complete search history.

(56) References Cited

U.S. PATENT DOCUMENTS

| 5,628,030 | A | 5/1997 | Tuckner |
| 5,790,895 | A | 8/1998 | Krontz et al. |
| 5,892,591 | A | 4/1999 | Anglin, Jr. et al. |
| 6,144,651 | A * | 11/2000 | Rinchiuso et al. ........... 370/335 |
| 6,360,281 | B1 | 3/2002 | Feagans |
| 6,546,016 | B1 | 4/2003 | Gerszberg et al. |
| 6,735,196 | B1 * | 5/2004 | Manzardo ................. 370/386 |
| 6,822,947 | B2 * | 11/2004 | Sawyer et al. .............. 370/328 |
| 2001/0039595 | A1 | 11/2001 | Kaihlaniemi |
| 2003/0045316 | A1 | 3/2003 | Tjong et al. |
| 2003/0053447 | A1 | 3/2003 | Thompson |
| 2004/0185777 | A1 * | 9/2004 | Bryson .................... 455/41.1 |
| 2004/0203668 | A1 * | 10/2004 | Bowne et al. ............ 455/414.1 |
| 2005/0102529 | A1 * | 5/2005 | Buddhikot et al. ......... 713/200 |

FOREIGN PATENT DOCUMENTS

| EP | 1 233 631 A2 | 8/2002 |
| WO | WO 02/45382 AW | 6/2002 |

OTHER PUBLICATIONS

Bluetooth, Bluetooth specification, Version 1.1, Serial Port Profile, Provile Overview, Feb. 22, 2001.
PC Micro Systems, COM/IP, The Virtual Modem for the Internet, version 3.11 released Aug. 5, 2003. Retrieved from the Internet: <http://pcmicro.com/comip/>.

* cited by examiner

*Primary Examiner*—Bob A Phunkulh
(74) *Attorney, Agent, or Firm*—Darby & Darby, P.C.

(57) ABSTRACT

A method and system for supporting data transfers between legacy application pairs and IP application pairs. An emulation module emulates a wireless connection such that a legacy application believes it is communicating directly with the wireless network. Data from one or more legacy applications and one or more IP applications can be multiplexed and data from the legacy applications and the IP applications encrypted and/or compressed prior to transfer between the application pairs.

88 Claims, 9 Drawing Sheets

METHOD AND SYSTEM FOR EMULATING A WIRELESS NETWORK

FIELD OF THE INVENTION

The present invention relates to a method and system for emulating a wireless network. In particular, the present invention relates to a method and system for allowing legacy applications historically communicating via a dedicated wireless transmission system to communicate via an open transmission system.

BACKGROUND OF THE INVENTION

The large majority of present day dispatch networks have been developed using proprietary hardware and software, usually manufactured by a single manufacturer, and typically cannot be connected to other networks or use other networking equipment due to the lack of common standards. Typically, the parties using the dispatch network are also the owners of the communication infrastructure and the applications which use the infrastructure as well as being employer of all the participants.

Implementation according to a set of open system standards makes sense in a networked environment where it may be wished to interconnect a large number of network components manufactured by a large number of different manufacturers. Migration to open systems typically increases the interconnectivity of a network, allowing the transfer of data, etc., between a significantly larger number of network participants. Additionally, given the standardisation of many of the features of an open system, a broader range of components, devices and even software can be purchased from a variety of third party sources, typically at a considerable savings over those purchased for a closed proprietary network. Also, continuing advances in technology mean that an increasing amount of processing power and communication band width can be taken advantage, leading to many new and advantageous applications.

Typically it is wished to take advantage of the benefits of the open system and to commence using new applications immediately. However, it is typically also wished to maintain the viability of existing applications, at least until such time as the new applications have reached a sufficient stability and extent of usage. It is apparent that much of the existing software and hardware infrastructure supporting the existing applications cannot be used as such in the open system. However, as the existing applications will typically be supplanted by new applications in the relatively near future, in many cases it does not make financial sense to port the applications so that they will work in an open system environment. Typically, therefore, in order to support both the existing applications and the new applications, both the existing software and hardware infrastructure as well as the new software and hardware infrastructure must be supported and maintained. This is particularly the case with dispatch networks, used by police forces amongst others, where there already exists a significant amount of dedicated software and hardware infrastructure supporting the dispatch applications, where the users are also interested in implementing applications within an open systems architecture.

There is therefore the need for a system which can support both applications developed using a closed system architecture and those developed using an open systems architecture, in particular those applications developed using TCP/IP.

SUMMARY OF THE INVENTION

There is disclosed a method for supporting data transfers of a legacy application, the legacy application comprising a local peer in a local end-system at a first point in a network and a remote peer in a remote end-system at a different point in the network. The method comprises the steps of, in a local emulation module in the local end-system, receiving commands and data from the local peer. The local emulation module in response to the commands emulates with the local peer a negotiation of a wireless connection of the remote peer with the local peer. Data is transferred between the local emulation module and a remote emulation module in the remote end system via at least one local emulation module to remote emulation module connection. The remote emulation module, in response to receiving the data, emulates with the remote peer a negotiation of a wireless connection of the local peer with the remote peer. The remote emulation module relays the data received from the local emulation module to the remote peer.

There is also disclosed a system for supporting data transfers of a legacy application, the legacy application comprising a local peer in a local end-system at a first point in a network and a remote peer in a remote end-system at a different point in the network. The system comprises a local emulation module in the local end-system, a remote emulation module in the remote end-system, and at least one connection between the local emulation module and the remote emulation module. The local emulation module receives commands and data from the local peer, the local emulation module in response to the commands emulating with the local peer a negotiation of a wireless connection of the remote peer with the local peer, the local emulation module transferring the data to the remote emulation module via the at least one connection, the remote emulation module in response to receiving the data emulating with the remote peer a negotiation of a wireless connection of the local peer with the remote peer, and the remote emulation module relaying data received from the local emulation module to the remote peer.

There is further disclosed a method for multiplexing data from at least one mobile legacy application with data from at least one mobile IP application. The method comprises the steps of, in an emulation module, receiving commands and the data from the mobile legacy application, the emulation module in response to the commands and the data emulating the negotiation of a wireless connection between the mobile legacy application and a fixed legacy application, the emulation module relaying the data to a packet manager, and the packet manager receiving the data from the at least one IP application and multiplexing the IP application data with the legacy application data.

Also, there is disclosed a method for transferring data between at least one local legacy application/remote legacy application pair and data from at least one local IP application/remote IP application pair. The method comprises the steps of, in an emulation module, receiving commands and the data from the local legacy application, the emulation module, in response to reception of the commands and the data, emulating the negotiation of a wireless connection between the local legacy application and the remote legacy application, the emulation module relaying the received data to a local packet manager, and the local packet manager multiplexing the data received from the local emulation module with data received from the at least one IP application and transferring the multiplexed data to a remote packet manager.

On reception, the remote packet manager de-multiplexes the multiplexed data and transfers the de-multiplexed data to the appropriate remote legacy application or remote IP application.

There is also disclosed an emulation module for emulating a connection between a mobile legacy application and a fixed legacy application, the mobile legacy application believing it is attached directly to a radio modem via a radio modem interface. The module comprises, for each connection being emulated, an emulation process emulating the radio modem interface, the emulation process receiving commands and data from the legacy application and in response to the commands and data, emulating the negotiation of a connection with the fixed legacy application.

Further, there is disclosed a system for transferring data between at least one local legacy application/remote legacy application pair and data from at least one local IP application/remote IP application pair. The system comprises a local emulation module and a remote emulation for each local legacy application/remote legacy application pair, a local packet manager and a remote packet manager. The local emulation modules, in response to reception of commands and data from the local legacy applications, emulates the negotiation of a wireless connection between the local legacy application and the remote legacy application, the emulation module relaying the data to the local packet manager. The local packet manager multiplexes the data received from the local emulation module with the data received from the at least one local IP application, the local packet manager transferring the multiplexed data to the remote packet manager. On reception of the multiplexed data, the remote packet manager de-multiplexes the multiplexed data and transfers the de-multiplexed data to the appropriate remote legacy application or remote IP application.

DETAILED DESCRIPTION OF THE ILLUSTRATIVE EMBODIMENTS

Figure 1:
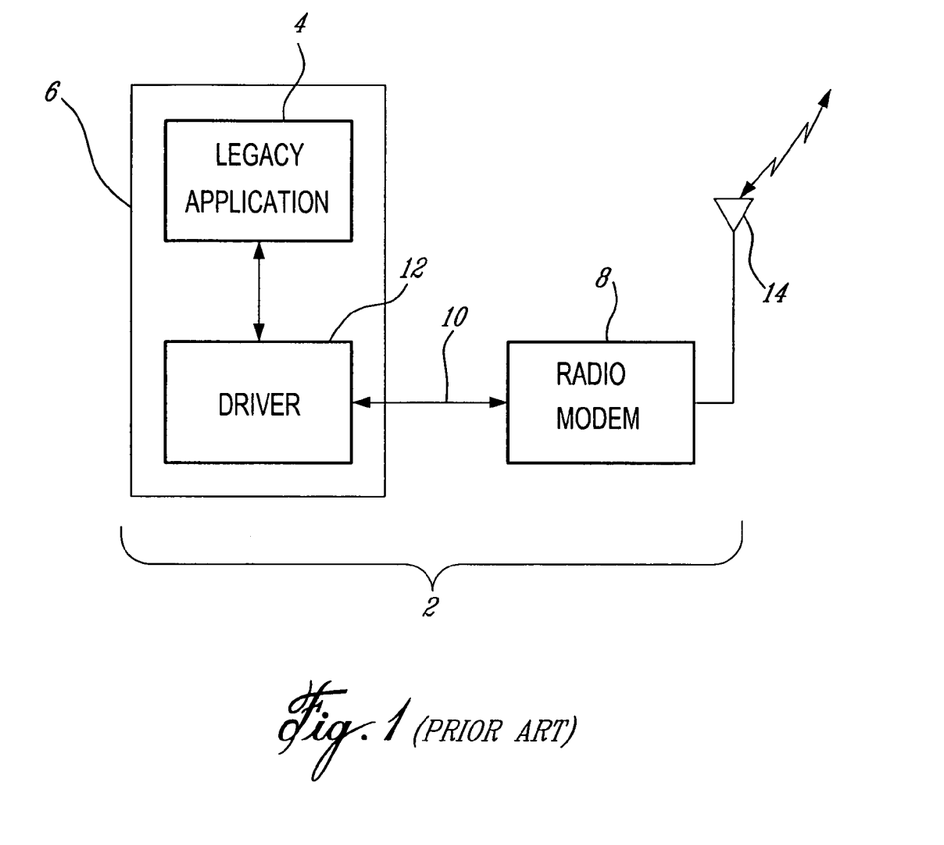
FIG. 1 is a functional model of a prior art mobile system.

Referring now to FIG. 1, a functional model of a prior art mobile system, generally referred to using the reference numeral 2, is disclosed. The prior art mobile system 2 is comprised of a mobile legacy application 4, for example in the form of a software application loaded into the memory of a portable terminal 6 (for example, a general purpose computer, a mobile data terminal or PDA), which communicates with a wireless modem 8 via an interface 10, for example an RS-232 interface, and driver software 12. The wireless modem 8 is typically located in proximity to the portable terminal 6 within which the legacy application 4 is housed. The wireless modem 8 receives commands and data via the interface 10 from the legacy application 4 which it transmits to other participants in the mobile network (not shown) via an antenna 14. Similarly, transmissions from other participants received at the antenna 14 are decoded by the wireless modem 8 and subsequent transferral to the legacy application 4 via the interface 10.

Figure 2:
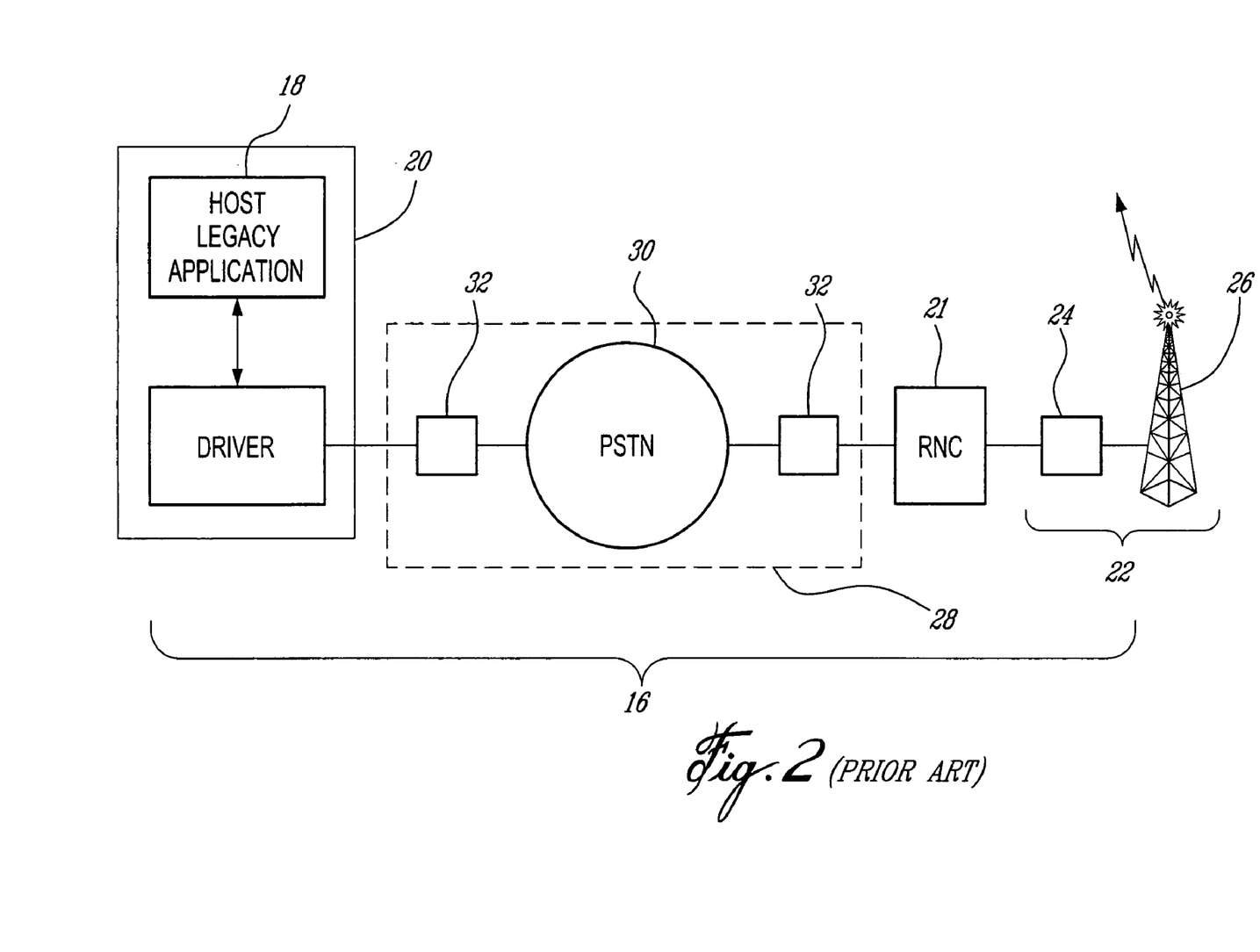
FIG. 2 is a functional model of a prior art fixed system.

Referring now to FIG. 2, a functional model of a prior art ground system, generally referred to using the reference numeral 16, is disclosed. The ground system 16 is comprised of at least one fixed host legacy application 18, for example in the form of a software application loaded into the memory of a host computer 20, which transfers data and control information, via a Radio Network Controller 21 (RNC), to and from one or more base stations 22, comprised of at least one base station controller 24 and antenna 26. As the base station 22 is typically at a location remote to the host computer 20 (for example, a general purpose computer) which houses the host legacy application 18, transfer of the control information between the host computer 20 and the base station 22 and communication system 28 to be interposed, for example a leased line on a PSTN 30, async, bisync, SNA, or, more commonly, X.25 dedicated circuits. Additionally, the RNC 21 is typically connected in the prior art to a plurality of base stations 22.

Both the host computer 20 and the base station 22 are attached to the PSTN via a modem 32 as is well known in the art. The base station controller 24 exchanges data with mobile systems 2 (as described hereinabove) via the antenna 26. A typical ground system will include the deployment of a number of base stations 22, each comprised of at least one base station controller 24 and antenna 26 in order to provide coverage over a large area.

A typical two-way radio dispatch system consists of an operating centre controlling the operation of a fleet of vehicles such as taxis, police cars, trucks, rail cars and the like. In order to cover a large area, the operating centre will communicate with the fleet via a large number of base stations. For example, the ARDIS™ system has approximately 1400 base stations occupying 1100 cell sites. Remote users access the system from mobile systems 2 such as laptop terminals (not shown), which communicate with the base stations 22. The ARDIS™ system uses an operating frequency band of 800 MHz and the RF links use separate transmit and receive frequencies, 45 MHz apart, that are simultaneously used to form a full-duplex channel. The ARDIS™ system currently implements two protocols in the RF-channel, MDC-4800 and RD-LAP and as such, supports primarily two-way mobile data communications for short length radio messages in urban and in-building environments, and for users travelling at relatively low speeds.

RD-LAP, or Radio Data-Link Access Procedure, is a protocol for supporting land mobile data communication networks. The network enables the transfer of data among subscribers, typically from users in the field to a dispatch or command center or from one user in the field to another. RD-LAP provides for data rates of up to 19,200 bits per second between base station 22 and mobile system 2. In the physical channel, Gaussian Frequency Shift Keying (GFSK) has been implemented as the modulation technique.

In the ARDIS™ system base station power is approximately 40 W, which provides line-of-sight coverage up to a radius of 10 to 15 miles. On the other hand, the mobile systems 2 operate with 4 W of radiated power. The areas covered by the individual base stations overlap to increase the probability a signal from a mobile system 2 to reach at least one base station 22.

Figure 3:
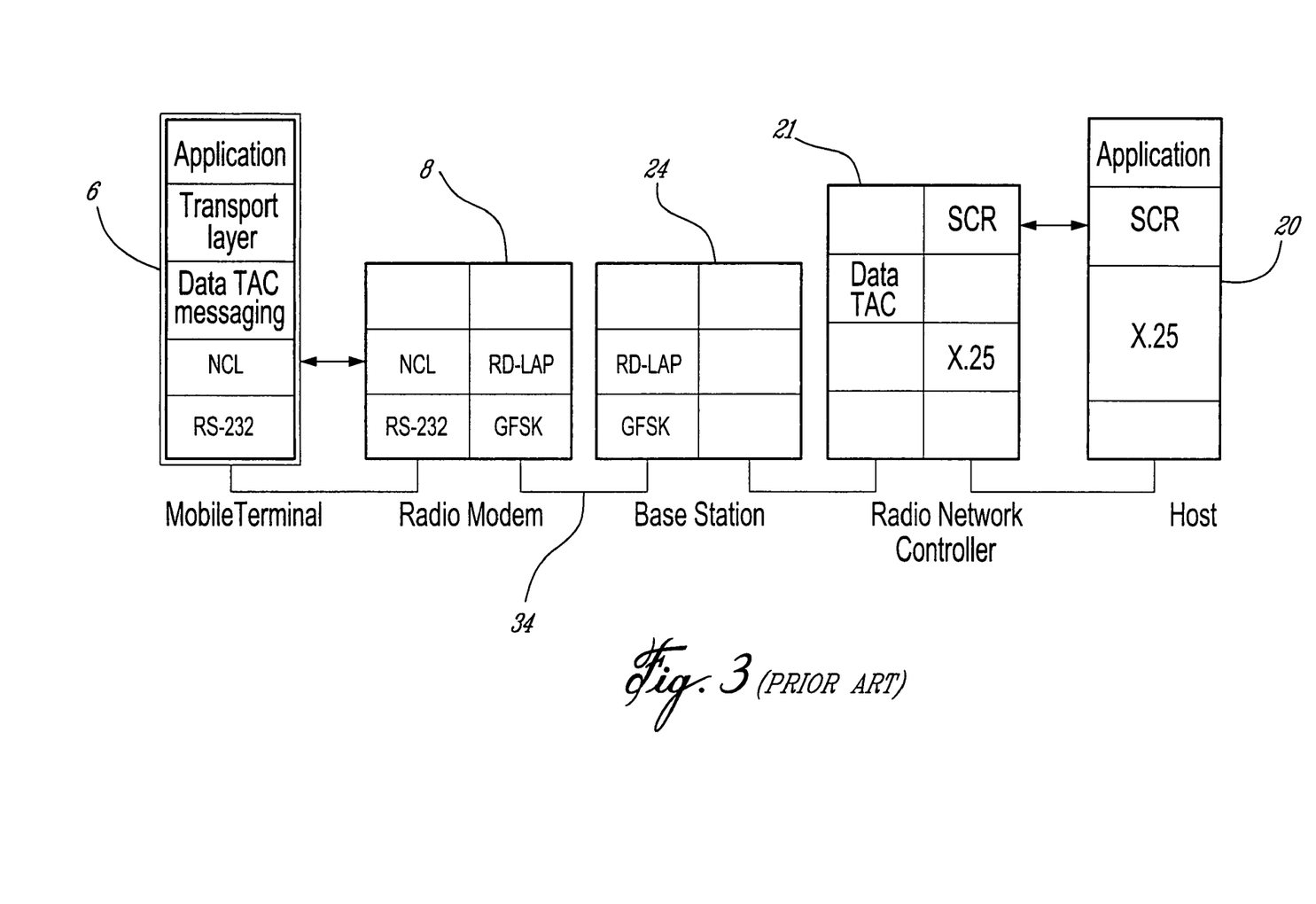
FIG. 3 is a layered conceptual model of a prior art wireless network.

Referring now to FIG. 3, a conceptual model of a prior art communication system based on the DataTAC™ network is disclosed. This conceptual model takes advantage in part of the Open Systems Interconnection (OSI) reference model. As is well known in the art, the OSI reference model is a hierarchical structure of layers that defines the requirements for communications between two computers as defined by the International Standards Organisation (ISO). Its primary benefit is to allow interoperability across the various platforms offered by different vendors. Supporting the model are an extensive pallet of performance and interfacing standards. The interoperability of devices adhering to the same set of standards is ensured, thereby allowing diverse network elements to inter-operate, regardless of the manufacturer, provided they subscribe to the same standard sets.

The DataTAC™ network provides data communications between a portable terminal 6 and a host computer 20 via a wireless connection 34. The wireless connection is set up between a wireless modem 8/BASE STATION radio network controller (RNC) 24 pair using the RD-LAP protocol as discussed hereinabove running over GFSK as modulation technique.

In the disclosed prior art embodiment, the mobile terminal 6 is interconnected with the wireless modem 8 via an RS-232 interface over which Native Command Language (NCL) is exchanged. As is known to persons of skill in the art, in the DataTAC system, NCL is the device link protocol by which the mobile terminal 6 can communicate with the wireless modem 8 in order exchange control information and transfer data which was received by or is to be sent by the wireless modem 8. In this prior art embodiment the wireless modem 8 is also accessible via a Hayes compatible interface and the well known AT command set.

It will be apparent now to a person of ordinary skill in the art that, in the prior art, the mobile terminal 6 is typically located in proximity to the wireless modem 8 (or alternatively, the wireless modem 8 is incorporated in the mobile terminal 8 as a sub component).

Figure 4:
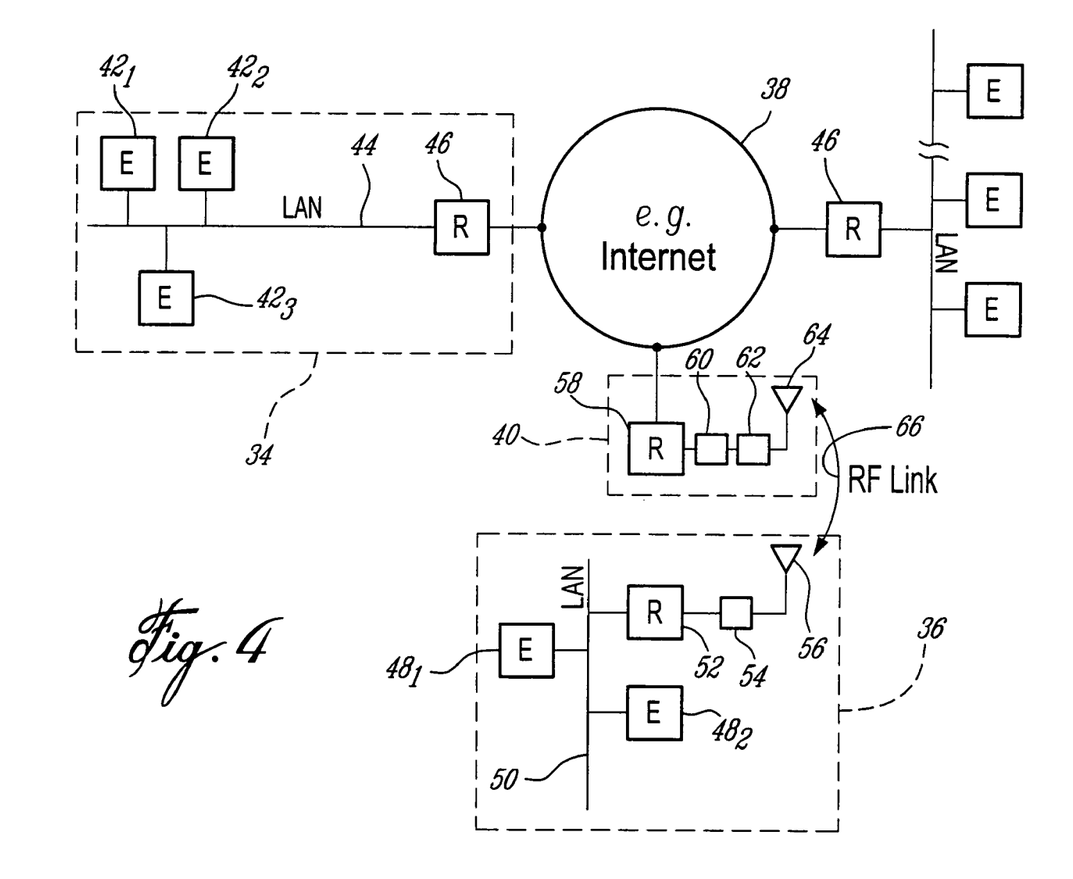
FIG. 4 is a schematic diagram of a wireless network in accordance with an illustrative embodiment of the present invention.

Referring now to FIG. 4, a system in accordance with an illustrative embodiment of the present invention will be disclosed. The system comprises at least one ground system 34 that is interconnected with at least one mobile system 36 via, for example, the internet 38 and at least one ground station 40.

Each ground system 34 is comprised of one or more applications (or end systems) as in $42_1$, $42_2$, $42_3$, interconnected by a LAN 44 or the like. It will be understood that the LAN 44 can be based on a number of different types of networking technologies alone or in combination, for example the ubiquitous Ethernet (IEEE 802) supported by twisted pair conductors (IEEE 802.3), FDDI, Token Ring or wireless technologies such as IEEE 802.11, Blue Tooth™ and the like. Access to the Internet 38 via the LAN 44 is provided via a Router 46. As is well known in the art, routers forward packets of data marked with an appropriate destination address either to the end system having that destination address or to another router which is closer to the end system having that destination address.

Similar to the ground system 34, each mobile system 36 is comprised of one or more end systems $48_1$, $48_2$ interconnected by a LAN 50 or the like. Again, it will be understood that the LAN 50 can be based on a number of different types of networking technologies as discussed hereinabove. Access to the ground station 40, and thus the Internet 38, is provided via a mobile message router 52 connected to the LAN 50 and a radio modem 54/antenna 56 pair. It will be understood to persons of ordinary skill in the art that in a given embodiment the mobile system 36 could also be comprised of a single end system directly connected to the radio modem 54/antenna 56 pair (via, for example, an RS-232 interface) without the provision of an interposed LAN and router.

Each ground station 40 is comprised of a fixed message router 58 interconnected via a radio network controller 60 with at least one base station 62/antenna tower 64 pair. In order to provide the mobile system 36 access to the Internet 38 and therefore end systems such as $42_1$, $42_2$, $42_3$ which are also connected to the Internet 38, an RF link 66 is established between the mobile system 36 and ground station 40. As stated above, in an illustrative embodiment the RF link 66 is based on RD-LAP with GFSK modulation providing the signalling in the physical channel.

Figure 5A:
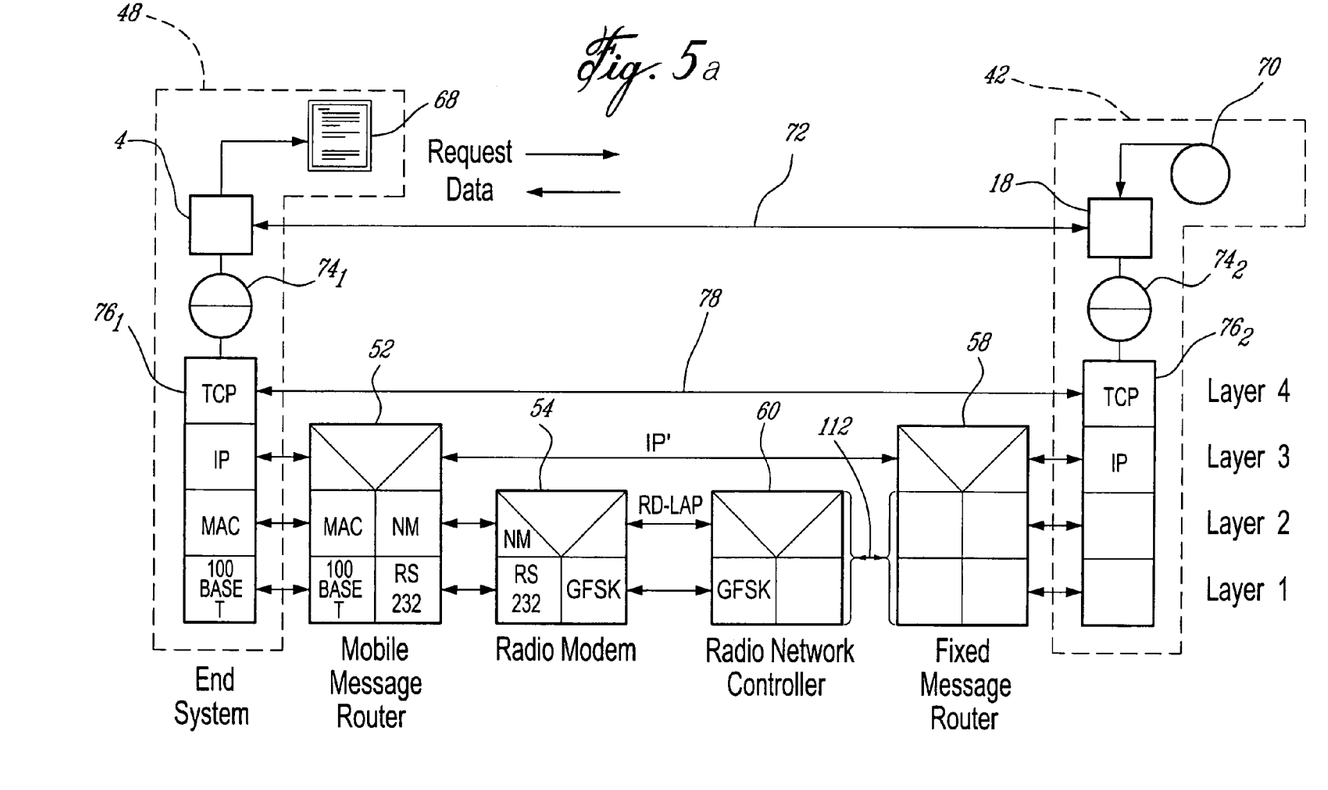
FIG. 5a is a layered conceptual model of a wireless network in accordance with an illustrative embodiment of the present invention.

Referring now to FIG. 5a, a conceptual model of an illustrative embodiment of the present invention will be described. As in the above, this conceptual model takes advantage in part of the Open Systems Interconnection (OSI) reference model. In particular, although not conforming 100% to the OSI reference model, the present illustrative embodiment includes reference to TCP/IP, the fundamental protocol for transferring data via the Internet, which applies only a subset of the whole OSI model (in large part only layers 1 through 4).

Still referring to FIG. 5a, in order for a (in this case mobile) local peer, in the form of a legacy application 4 (for example an application for displaying data on a terminal 68), to communicate with a remote (in this case fixed) peer of a fixed host legacy application 18 (for example an application for retrieving data from a data bank 70) to retrieve pages of text based data for display, a communication channel 72 is established between the local peer 4 and the remote peer 18. As discussed hereinabove in reference to the prior art, traditionally the legacy application would set up and maintain a communication channel between the local and remote peers by communicating directly in native mode with the wireless modem. However, as in the present illustrative embodiment it is foreseen to take advantage of the transport layer, and in particular TCP/IP as discussed hereinbelow, for providing a reliable end-to-end connection between the local peer 4 and the remote peer 18 without having a direct interface to the radio modem 54, emulation modules $74_1$, $74_2$ are provided for.

Logically, the emulation modules $74_1$, $74_2$ are positioned between the transport layers $76_1$, $76_2$, and the local and remote peers 4, 18 and receive data and control information from both these layers. Generally, it can be said that data received by an emulation module $74_1$, $74_2$ from its respective local peer is relayed to the remote peer via one or more logical connections 78, for example transport connections established between the transport layers $76_1$, $76_2$. Similarly, data received by an emulation module $74_1$, $74_2$ via the logical connection 78, for example from its local transport layer, is relayed to its local peer. In an alternative embodiment, the transport layers $76_1$, $76_2$ are integrated into, and form part of, their respective emulation modules $74_1$, $74_2$.

To provide reliable transport services, transport layers $76_1$, $76_2$ may establish a connection-oriented session with one another. For example, in the event that the transport layer $74_1$ in the mobile end system 48 wishes to establish a connection with the transport layer $74_2$ in the ground end system 42, it does so by first sending a connection request packet to the ground transport layer $74_2$. The ground transport layer $74_2$ replies by acknowledging the connection request. Once the acknowledgement is received by the mobile transport layer $74_1$, the connection is established and data transfer can begin.

Figure 5B:
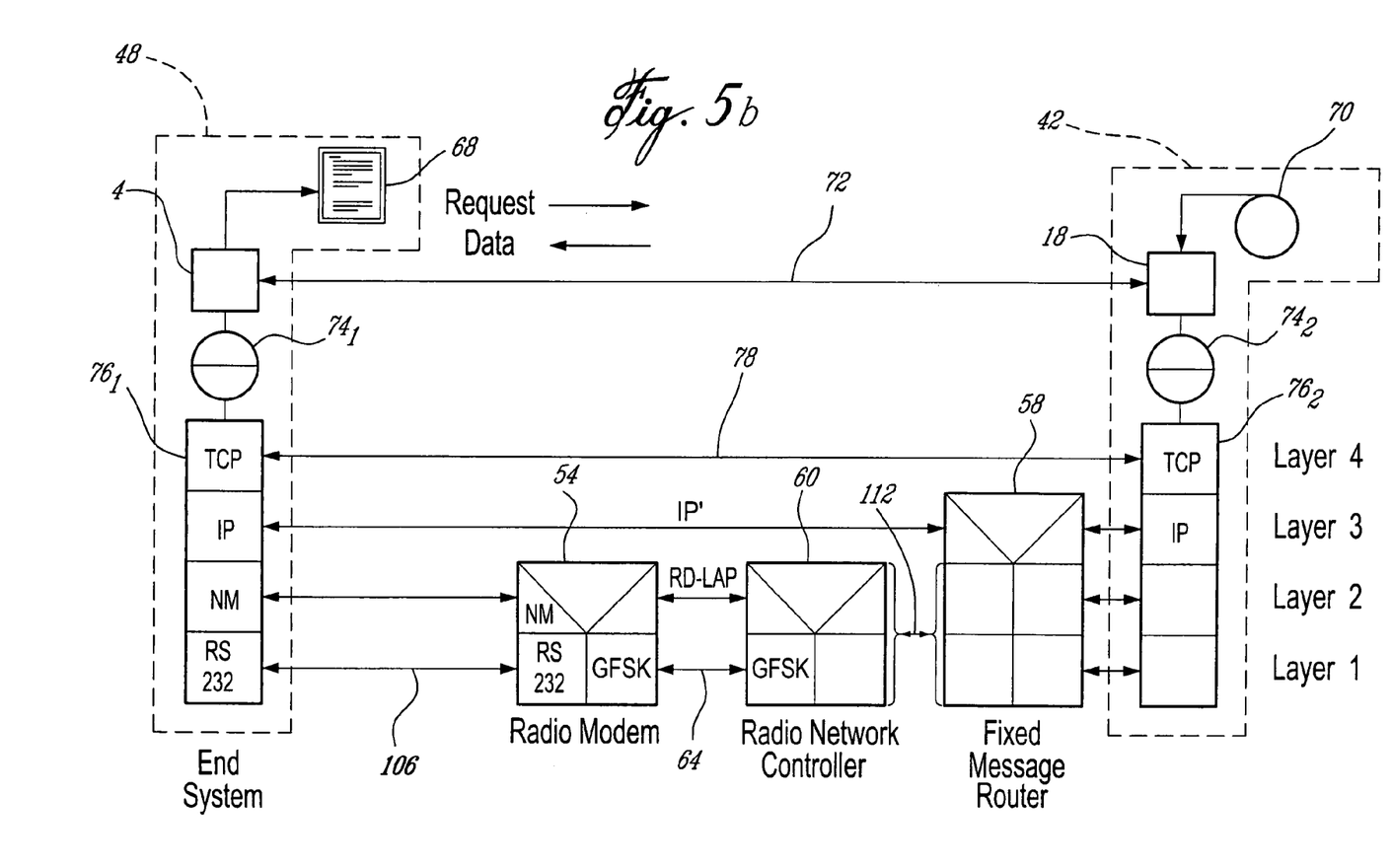
FIG. 5b is a layered conceptual model of a wireless network in accordance with an alternative illustrative embodiment of the present invention.

In a conceptual model of a second illustrative embodiment of the present invention, as disclosed in FIG. 5b, the functionality of the mobile message router 52 as disclosed in FIG. 5a could be integrated into the protocol stack of the end system 48. In this embodiment, the end system 48 would communicate directly with the radio modem 54, for example via an RS-232 interface and the native mode protocols.

As stated above, in a first illustrative embodiment the transport connections between local and remote end-systems are established using TCP. TCP, which corresponds to the transport layer (Layer 4) of the OSI reference model, provides reliable transmission of data in an IP environment. TCP offers reliability by providing connection-oriented, end-to-end reliable packet delivery via an underlying network which potentially may be comprised of many heterogeneous networks. TCP does this by sequencing packets with a forwarding acknowledgement number that indicates to the destination the next packet the source expects to receive. Packets not acknowledged within a specified time period are retransmitted. The reliability mechanism of TCP allows devices to deal with lost, delayed, duplicate, or misread packets. A time-out mechanism allows for the detection of lost packets and request their retransmission.

Reliability in TCP is provided by the use of a positive acknowledgement and retransmission (PAR) technique combined with a sliding window where, when a packet or group of packets is sent, a timer is started. The sender awaits an acknowledgement before sending a new packet. If the acknowledgement is not received before the timer expires, the sender retransmits the packet. By assigning each packet a sequence number, PAR allows lost or duplicate packets caused by network delays to be tracked that would otherwise cause that result in premature retransmission. The sequence numbers are sent back in the acknowledgements so that the received packets can be tracked by the sender.

In order to improve efficiency through more efficient use of network bandwidth, TCP provides for a sliding window wherein a sender may transmit multiple packets before waiting for an acknowledgement. On receiving an acknowledgement that a packet has been received, the window is incremented. An initial window size is indicated at connection set-up, but the receiver is able to specify a current window size in every acknowledgement packet, allowing the receiver to control the flow of packets as necessary.

A person of ordinary skill in the art will understand that, although the present illustrative embodiment makes use of TCP/IP in order to provide the connection between end systems 42, 48, other transport protocols, for example those conforming to ISO 8073 or other proprietary protocols, could also be used.

Figure 6A:
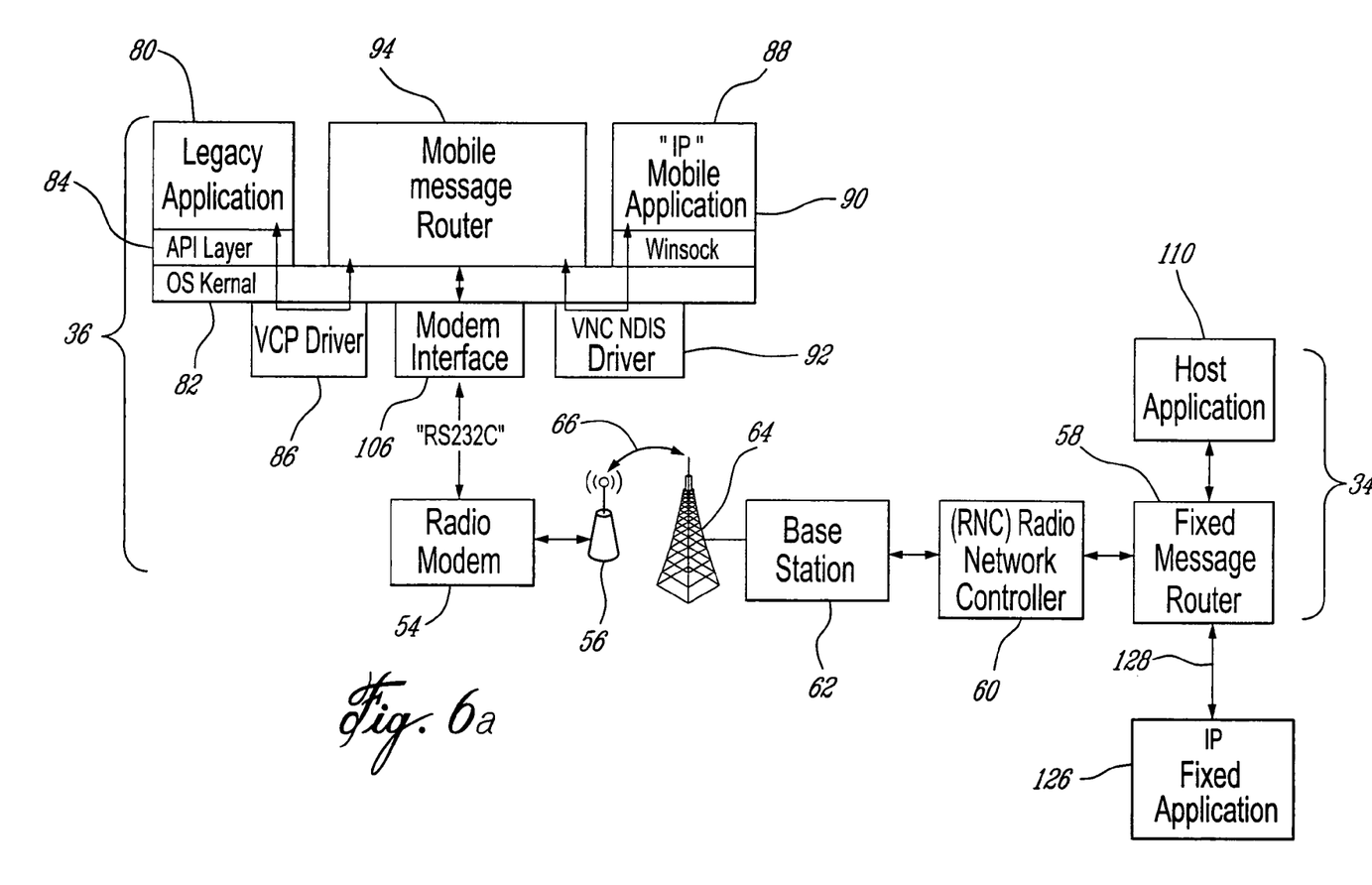
FIG. 6a is a functional model of a wireless network in accordance with an illustrative embodiment of the present invention.

Referring now to FIG. 6a, a functional model of an illustrative embodiment of the present invention will now be described. Although the functional model has been developed partly with reference to the Windows™ operating system, it will be apparent to those of ordinary skill in the art that other operating systems, such as UNIX™, Linux™, NeXTStep™, BeOS™, OS/2™, OpenVMS™, and the like could also be used without departing from the spirit and nature of the present invention.

In the illustrated embodiment, a mobile legacy application 80 communicates with the Operating System (OS) kernel 82, in this illustrative embodiment the Windows operating system, via an Application Programming Interface (API) layer 84. As is known in the art, the API layer 84 provides a uniform interface by which an application, using function calls, can request services from the operating system and send and receive data. In responding to the function calls of the legacy application 80, the kernel 82 is supported by a library of device specific (in the illustrated embodiment, those supporting a virtual communications port) drivers 86. In a similar fashion, a mobile IP application 88 communicates with kernel 82 via a socket interface 90 as is known in the art. In responding to requests from the IP application 88 received via the socket interface 90, the kernel 80 is supported by a library of device specific drivers 92 (in the illustrated embodiment, those supporting a virtual network card).

Still referring to FIG. 6a, a mobile message router 94 is located functionally between the legacy application 80 and the radio modem 54 and the IP application 88 and the radio modem 54. Note that although in the functional diagram of FIG. 6a the mobile message router 94 appears to be hosted on the same physical machine (computer) as the legacy application 80, persons of skill in the art will appreciate that the mobile message router 94 could be hosted in a different remotely located machine, connected with the machine hosting the legacy application 80 via a LAN (not shown) or the like. In such a case it is to be understood that the virtual communication port driver 86 will be remotely connected using an available communication port, such as TCP/IP, with the mobile message router 94.

It will be apparent now to persons of ordinary skill in the art that the legacy application 80 is not in direct communication with the radio modem 54. Instead each legacy application 80 communicates with the mobile message router 94 via a virtual communication port that emulates the functioning of a radio modem. Communication with the mobile message router 94 is initiated by calling the appropriate API layer 84 functions to open the virtual communication pod of the system (computer) on which the legacy application 80 is hosted (for example, in Win32 API the OpenHandle( ) function). In the present illustrative embodiment, the API layer 84 returns a handle that is used to uniquely identify the virtual communications port, and will be released by the legacy application 80 through appropriate function calls via the API layer 84 (for example, in Win32 API the CloseHandle( ) function), or when the application terminates. The legacy application 80 views the virtual communication port as if it were a standard serial port connected to a radio modem, for example a radio modem having a serial interface such as a DTE/DCE interface, a serial interface, a V.34 interface, a Native Command Language interface or a Hayes compatible interface.

Figure 6B:
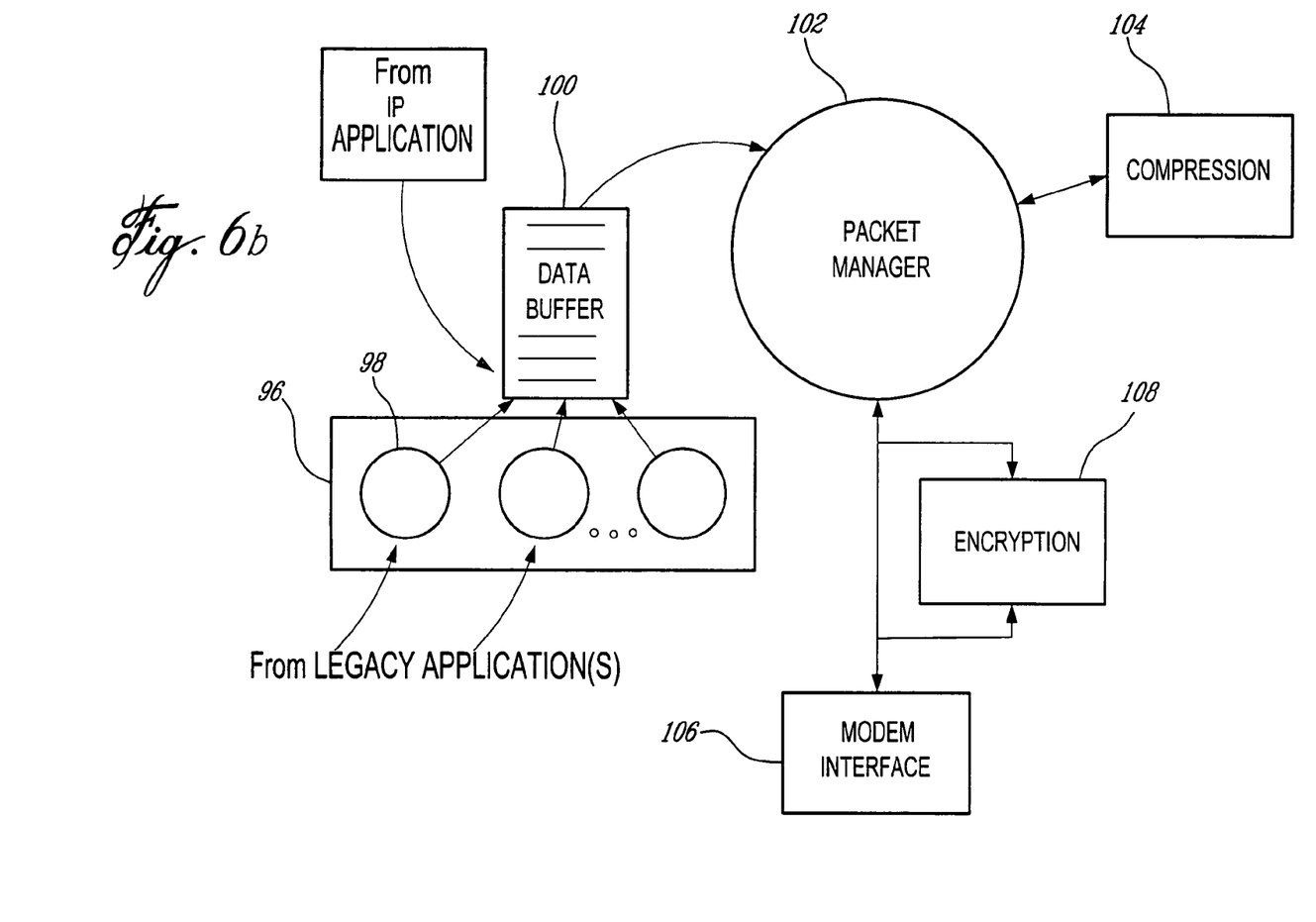
FIG. 6b is a functional model of a mobile message router in accordance with an illustrative embodiment of the present invention.

Referring now to FIG. 6b in addition to FIG. 6a, as communications exchanged between a legacy application and a radio modem conform to the radio modem protocol, a modem emulator 96 in the mobile message router 94 interprets data received from the legacy application 80 via the virtual communication port and emulates the same behaviour as a physical radio modem. In an illustrative embodiment the modem emulator 96 emulates the behaviour of both the command and data modes of a physical modem.

In the command mode, the modem emulator 96 retains the status of each wireless connection that it is emulating. In this regard, it should be noted that more than one legacy application 80 could be operating within the same mobile system 36. Illustratively, the modem emulator 96 would spawn an emulation process as in 98 for each legacy application 80 which intends to transmit data via the radio modem 54. Each emulation process as in 98 would emulate a radio modem such that the legacy application 80 believes it is attached directly to the radio modem via a radio modem interface. In this regard, the emulation processes as in 98 emulates the negotiation of a wireless connection between a mobile legacy application and a fixed legacy application. A person of ordinary skill in the art that negotiation of a wireless connection comprises connection establishment, data transfer and connection release.

It will also be understood to a person of skill in the art that the modem emulator 96 can emulate a modem having a different protocol than an actual radio modem as in 54 actually used to transfer data, and is not restricted a particular feature set as would otherwise be dictated by the radio modem 54.

Once the emulation process 98 is spawned and connection between the legacy application 80 and the emulation process 98 has been established, the legacy application 80 can send either commands or data to the emulation process 98. In this regard, commands are instructions which would otherwise by used to control the radio modem 54, and are generally used to control the radio modem's behaviour vis-à-vis the supporting radio network infrastructure or the legacy application 80 itself. All commands are interpreted by the emulation process 98 in a manner that the legacy application 80 believes it is communicating with a physical radio modem directly. As a result, each emulation process 98 maintains a record of its current state (and illustratively, even after a complete reboot of the machine on which it is hosted) and emulates responses to commands received from its related legacy application 80, for example requests for a radio modem configuration or serial number. Some of these requests might be answered using information retrieved from the physical radio modem 54, but might also come from the configuration provided to the mobile message router 94 at installation, or remotely during an initialisation phase (for example, from a server message processor, not shown).

Still referring now to FIG. 6b in addition to FIG. 6a, in the present illustrative embodiment, when data is sent by the legacy application 80 to the emulation process 98 through the virtual communication port provided by the API 82, the OS kernel 84 and the virtual communications port drivers 86, each emulation process 98 buffers the data in a data buffer 100 for subsequent processing and returns an acknowledge to the legacy application 80. The legacy application 80 is then free to send more data to the emulation process 98. Data is buffered in the data buffer 100 until a buffer length limit or a timeout is reached, thereby allowing the legacy application 80 to send a series of data messages to the mobile message router 94 to be re-organised into one or more data packets.

Data written into the data buffer 100 by the one or more emulation processes 98 is sequentially processed by a data packet manager 102. As the data to be transferred from the legacy application 80 is typically textual, significant reductions in the amount of data to be transferred can be achieved by compressing the data using one of a number of suitable compression techniques or algorithms, for example 3rd-Order Arithmetic, Z-Lib, RLE or LZW. In this regard, data which is written into the data buffer 100 is compressed by a compression module 104, also located within mobile message router 94. Compressed data is subsequently reformatted into formatted data packets by the packet manager 102.

Referring back to FIG. 6a, as described above, IP mobile applications 88 also send IP packets to IP fixed applications through the mobile message router 94. Referring now to FIG. 6b, data included in IP packets is extracted and placed in the data buffer 100. This means that data originating with either a mobile legacy application 80 or a mobile IP application 88 is buffered within the same data buffer 100 and will be processed by the packet manager 102. In this regard, it will be understood to a person of skill in the art that there might be many IP applications 88 running at the same time on the same physical machine.

The packet manager 102 sends and receives data packets via the radio modem 54 which it accesses via, for example a radio modem interface 106 (for example a RS-232 serial port as shown in FIG. 6a). The packet manager 102 uses, for example, a proprietary protocol for sending and receiving data, providing acknowledgements of data reception as well as request data reception acknowledgement.

Prior to transmission via the radio modem interface 106, reformatted data packets are optionally encrypted within the mobile message processor 94 by an encryption module 108. The use of encryption ensures that all the data transmitted over the wireless connection, which can typically be easily intercepted by parties other than the intended recipient(s), remains secure. The types of encryption which may be used comprise DES, 3-DES, FIPS140-1, RSA and AES, and the like.

The (optionally encrypted) data packets are encapsulated in a format which is compatible with the radio modem 54, and then transmitted to the radio modem 54 via the radio modem interface 106. The radio modem 54 subsequently transmits the data packets via the RF link 66, antenna tower 64 and base station 62 and using, for example, a protocol such as RD-LAP or MDC 4800 over GFSK.

Transmissions received via the base station 62/antenna tower 64 pair are relayed to the radio network controller 60 where they are decoded. A transmission can contain information related to control or data. In this regard, the radio network controller 60 acts as the peer with which the radio modem(s) 54 communicate. Control information is exchanged between the radio modem 54 and the radio network controller 60, and can include information related to modem registration or host availability. Data information comprises the data packets sent by either one or more mobile legacy applications as in 80 or IP applications as in 88 to either legacy host applications as in 110 or IP fixed applications as in 126.

In a typical implementation a single fixed message router 58 is the only host to which the radio network controller 60 relays data (although in other embodiments it is foreseeable that dedicated host applications would directly access the radio network controller 60). As a result, the fixed message router 58 receives all data packets relayed by radio modem(s) 54 transmitting via a given associated base station 62/antenna tower 64 pair, as well as an indication as to the identity of the radio modem which was used to transmit the data packet in the form of a radio modem identifier.

Referring now to back to FIG. 5a, the fixed message router 58 communicates with the radio network controller 60 via a radio network controller interface 112. The protocols used over this interface are typically proprietary and include, for example, Dataradio DMP, EDACS RDI, ESTeem SCA, Mobitex MASC and MPAK.

Figure 6C:
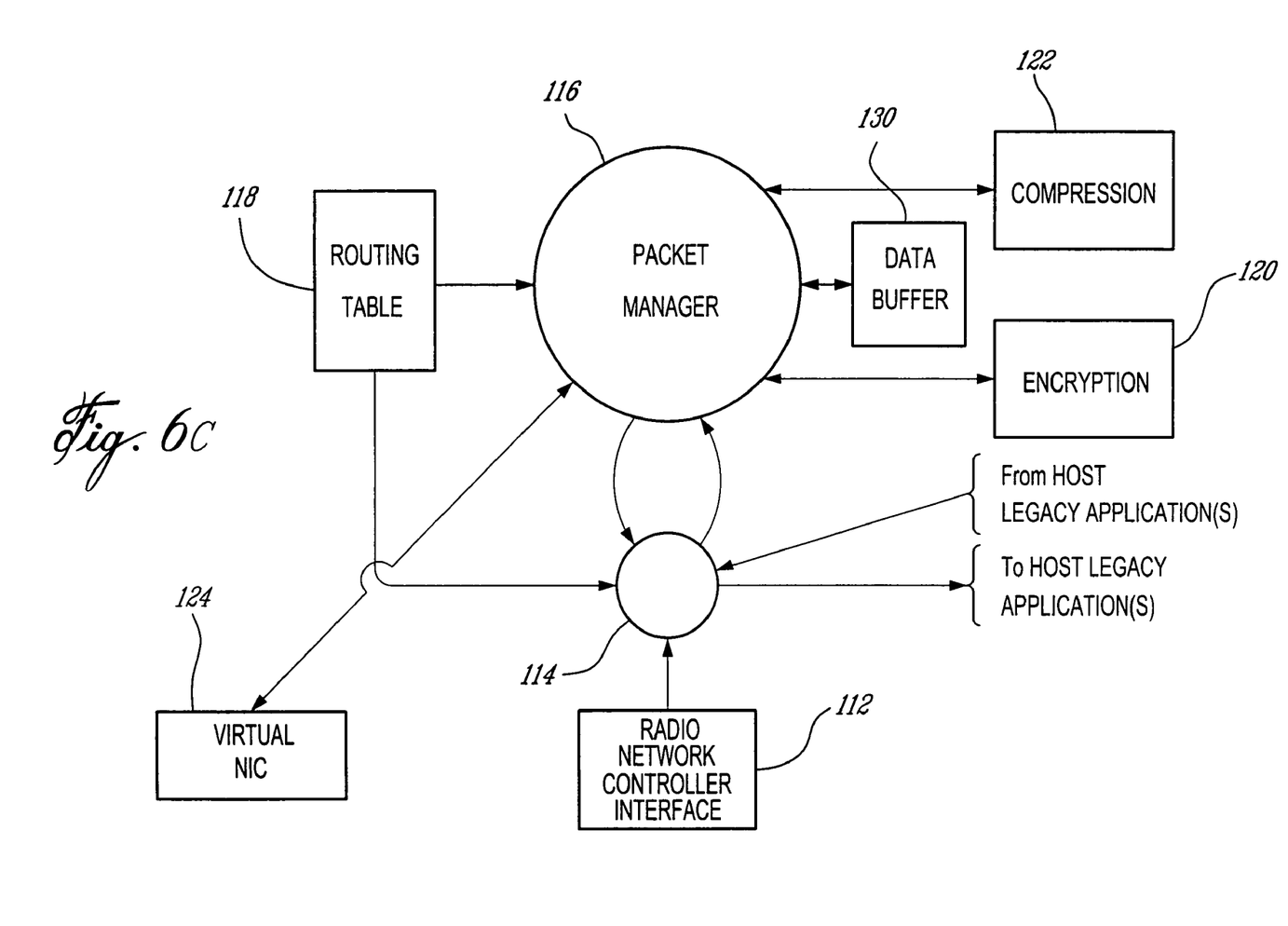
FIG. 6c is a functional model of a fixed message router in accordance with an illustrative embodiment of the present invention.

Referring now to FIGS. 6a and 6c, data received via the interface 112 is first examined by a routing process 114. In this regard, it is foreseen that systems according to the present invention will be able to operate in parallel with systems which transmit data between a mobile legacy application and a host legacy application in a conventional manner (i.e. with the mobile legacy application directly accessing the radio modem). Therefore, as data received by a given radio network controller 60 and relayed to the fixed message router 58 may have originated from either a mobile system equipped with a mobile message router 94 and a virtual communications port, or from a mobile system where the mobile legacy application communicates directly with the radio modem 54 via a modem interface as known in the prior art, the routing process 114 is required to differentiate between these two. In this regard, the mobile system is typically flagged as conventional or non-conventional during system initialisation and an entry in a look up table, which corresponds to the identifier of the radio modem, is updated and made available.

Data received from a conventional mobile system (i.e. a mobile system not equipped with a mobile message router 94) is simply routed by the routing process 114 to the destination host application as in 110. Data received from a system equipped with a mobile message router 94 is relayed, along with the radio modem identifier as discussed hereinabove, to a packet manager 116 for further processing. The packet manager 116 handles received data in part based on the entries in a predefined data packet routing table 118. In the present illustrative embodiment, the routing table 118 retains a list of radio modem identifiers and an indication of whether or not data received via a particular radio modem are encrypted (this is in large part in order to provide migration from an unsecured network to a secured network, as it will likely not be possible in all cases to deploy a secured network to an entire network fleet at the same time) as well as the type of encryption to be used. Encrypted data is redirected to an encryption module 120 for decryption.

Once the data has been decrypted, the packet manager 116 reconstructs the initial data stream sent by the mobile legacy application 80, reordering the data packets as necessary.

In the event that the decrypted and reordered data packets are compressed, the packet manager 116 redirects the data packets to a compression module 122 for decompression. The resulting decompressed data stream is then appropriately divided into application data messages which correspond to the original messages sent by the mobile legacy application 80 to the mobile message processor 94. In this regard, it will be understood by a person of ordinary skill in the art that a data packet containing compressed data may contain multiple messages.

The application data messages originating from a mobile legacy application 80 are then repackaged by the packet manager 116 into those protocols necessary to communicate with a host legacy application 110. The formatted data message is then sent to the message router 114, which redirects it to the corresponding host application 110. Even though multiple host applications as in 110 might connect to the message router at once, only the one host application as in 110 corresponding to the mobile identifier will receive the formatted data message (for example, one method would be to identify the mobile legacy application 80 using the identifier of the virtual communication port in order to redirect a data message to a specific host legacy application as in 110. This would allow having multiple mobile legacy applications as in 80 in a given mobile end system 36, each communicating with a different host legacy application as in 110).

The application data messages originating from a mobile IP application 88 are first reformatted by the packet manager 116 into IP packets to be sent to a virtual network card 124, and routed to their destination fixed IP application 126 using, for example, a fixed LAN 128.

The host applications as in 110 typically receives the data in a formatted message, indicating the source (radio modem or mobile identifier), the size (number of bytes) of the incoming data, and may also contain validation information such as a CRC or checksum if required by the host application 110. If the message containing the data is valid, the host application can then process the received data.

Fixed IP applications 126 receive data in the form of formatted IP packets.

In the event that a host application as in 110 wishes to send data to a mobile legacy application as in 80, the host application 110 transmits the data as one or more formatted messages, also indicating the destination (for example, the radio modem identifier), the size (number of bytes) of the outgoing data, and may also contain validation information such as a CRC or checksum. The resulting message is then transferred to the to the fixed message router 58. Based on the attributes of the destination as retrieved from the routing table 118, the message is redirected to the packet manager 116 if the destination is known to have a mobile message processor. If not, the message is simply redirected to the radio network controller 60 through the radio network controller interface 112.

In a similar fashion, IP packets received from the virtual network card 124 (routed from the LAN 128), are first processed to extract the transport data which is reformatted to be sent to an outgoing data buffer 130.

Based on the attributes of the mobile computer retrieved from the routing table, the data placed in the outgoing data buffer is then processed by the packet manager 116, for example compressed by the compression module 122, and encrypted by the encryption module 120 prior to being sent to the routing process 114 in the appropriate message format.

The routing process 114 relays all outgoing formatted messages, from legacy applications 110 or packet manager 116, to their destinations via the radio network controller 60, which sends it over the wireless media through the base station 62/antenna tower 64 pair.

The radio modem 54 relays data packets received via the RF link 66 using the antenna tower 64/base station 62 pair and the mobile antenna 56/radio modem 54 pair, to the mobile message router 94 via the modem interface 106. Referring now back to FIG. 6*b*, if necessary incoming data packets are decrypted by transferring them to the encryption module 108, which then relays the passing decrypted data to the packet manager 102. The packet manager 102 reorders the data packets as necessary, and decompresses the resulting data stream using the compression module 104. Once decompressed, the packet manager 102 reconstructs the original data stream, which might be data messages for a legacy application 80, or IP packets dedicated to a mobile IP application 88.

In the case of a data message for a legacy application 80, the data message is relayed to the appropriate emulation process 98 inside the modem emulator 96. The data message is then reformatted to conform to the emulated modem protocol, and sent to the legacy application 80 through a dedicated virtual communication port 86. The virtual communication port 86 notifies the legacy application 80 of the availability of the received data message using the normal notification mechanism used by the OS kernel 82 and API layer 84.

In the case of an IP packet related to an IP mobile application 88, the received IP packet is pushed to the virtual network card NDIS driver 92, and routed to the application using the standard mechanism provided by the OS kernel 82, and socket API 90.

Although the present invention has been described hereinabove by way of an illustrative embodiment thereof, this embodiment can be modified at will without departing from the spirit and nature of the subject invention.

What is claimed is:

1. A method for supporting data transfers of a legacy application, the legacy application comprising a local peer in a local end-system at a first point in a network and a remote peer in a remote end-system at a different point in the network, the method comprising the steps of:
- in a local emulation module in the local end-system, receiving commands and data from the local peer;
- said local emulation module in response to said commands emulating with the local peer a negotiation of a wireless connection of the remote peer with the local peer;
- transferring said data between said local emulation module and a remote emulation module in said remote end system via at least one local emulation module to remote emulation module connection;
- said remote emulation module, in response to receiving said data, emulating with the remote peer a negotiation of a wireless connection of the local peer with the remote peer; and
- said remote emulation module relaying said data received from said local emulation module to the remote peer.

2. The method of claim 1, wherein said local emulation module to remote emulation module connections are transport connections.

3. The method of claim 2, wherein said transport connections are connection oriented.

4. The method of claim 3, wherein said data transfer step further comprises opening at least one connection oriented transport connection between said local emulation module and said remote emulation module prior to transferring said data and closing said transport connections subsequent to transferring said data.

5. The method of claim 1, wherein said data is compressed when traversing said local emulation module to remote emulation module connection.

6. The method of claim 5, wherein said data is compressed using a compression selected from the group consisting of 3rd-Order Arithmetic, Z-Lib, RLE and LZW.

7. The method of claim 1, wherein said data is encrypted when traversing said local emulation module to remote emulation module connection.

8. The method of claim 7, wherein said data is encrypted using an encryption selected from the group consisting of DES, 3-DES, FIPS140-1, RSA and AES.

9. The method of claim 1, wherein said emulated wireless connection is RD-LAP transmitted over GFSK.

10. The method of claim 1, wherein said local end system is a mobile end system and said remote end system is a fixed end system.

11. The method of claim 1, wherein said local end system is a fixed end system and said remote end system is a mobile end system.

12. The method of claim 1, wherein said local end system and said remote end systems are mobile end systems.

13. The method of claim 1, wherein said emulated wireless connection is between a wireless modem and a radio network controller.

14. The method of claim 2, wherein the network is the Internet and said transport connections are selected from the group consisting of UDP and TCP.

15. The method of claim 14, wherein said transport connections are TCP.

16. The method of claim 2, wherein the network is an ISO compatible network and said transport connections are OSI class 4 transport connections.

17. The method of claim 1, wherein said local and remote emulation modules include a transport layer using protocols conforming to ISO 8073.

18. The method of claim 17, wherein said local and remote emulation modules communicate with said transport layer via an ISO 8072 compatible interface.

19. The method of claim 1, wherein said local and remote emulation modules include a TCP transport layer.

20. The method of claim 19, wherein said local and remote emulation modules communicate with said transport layer via a socket interface.

21. The method of claim 1, wherein said local and remote emulation modules include a TCP transport layer, said local module is a TCP server and said remote module is a TCP client.

22. The method of claim 1, wherein said local and remote emulation modules include a TCP transport layer, said local module is a TCP client and said remote module is a TCP server.

23. The method of claim 1, wherein said local and remote emulation modules emulate a DCE.

24. The method of claim 1, wherein said local and remote emulation modules emulate a serial interface.

25. The method of claim 1, wherein said local and remote emulation modules emulate a V.34 interface.

26. The method of claim 10, wherein said local emulation module emulates a Native Command Language interface between said local emulation module and said local peer.

27. The method of claim 11, wherein said remote emulation module emulates a Native Command Language interface between said remote emulation module and said remote peer.

28. The method of claim 1, wherein said local and remote emulation modules emulate a Hayes compatible interface between said emulation modules and said peers.

29. The method of claim 1, wherein said local and remote emulation modules emulate the API of a Native Command Language interface between said emulation modules and said peers.

30. The method of claim 1, wherein said data transferring step is supported by a data communications network comprising a wireless connection compatible with the legacy application.

31. The method of claim 30, wherein said data is encrypted when traversing said wireless connection.

32. The method of claim 31, wherein said data is encrypted using an encryption selected from the group consisting of DES, 3-DES, FIPS140-1, RSA and AES.

33. The method of claim 30, wherein said data is compressed when traversing said wireless connection.

34. The method of claim 33, wherein said data is compressed using a compression selected from the group consisting of 3rd-Order Arithmetic, Z-Lib, RLE and LZW.

35. The method of claim 30, wherein said wireless connection is RD-LAP transmitted over GFSK.

36. The method of claim 1, wherein said emulation of a negotiation of a wireless connection comprises emulation of a wireless connection establishment, emulation of a wireless data transfer and emulation of a wireless connection release.

37. A system for supporting data transfers of a legacy application, the legacy application comprising a local peer in a local end-system at a first point in a network and a remote peer in a remote end-system at a different point in the network, the system comprising:
- a local emulation module in the local end-system;
- a remote emulation module in the remote end-system; and
- at least one connection between said local emulation module and said remote emulation module; and
- wherein said local emulation module receives commands and data from the local peer, said local emulation module in response to said commands emulating with the local peer a negotiation of a wireless connection of the remote peer with the local peer, said local emulation module transferring said data to said remote emulation module via said at least one connection, said remote emulation module in response to receiving said data emulating with the remote peer a negotiation of a wireless connection of the local peer with the remote peer, and said remote emulation module relaying data received from said local emulation module to the remote peer.

38. The system of claim 37, wherein said local emulation module to remote emulation module connections are transport connections.

39. The system of claim 38, wherein said transport connections are connection oriented.

40. The system of claim 37, wherein said emulated wireless connection is RD-LAP transmitted over GFSK.

41. The system of claim 37, wherein said data is compressed when traversing said local emulation module to remote emulation module connections.

42. The system of claim 41, wherein said data is compressed using a compression selected from the group consisting of 3rd-Order Arithmetic, Z-Lib, RLE and LZW.

43. The system of claim 37, wherein said data is encrypted when traversing said local emulation module to remote emulation module connections.

44. The system of claim 43, wherein said data is encrypted using an encryption selected from the group consisting of DES, 3-DES, FIPS140-1, RSA and AES.

45. The system of claim 37, wherein said local end system is a mobile end system and said remote end system is a fixed end system.

46. The system of claim 37, wherein said local end system is a fixed end system and said remote end system is a mobile end system.

47. The system of claim 37, wherein said local end system and said remote end systems are mobile end systems.

48. The system of claim 37, wherein said emulated wireless connection is between a wireless modem and a radio network controller.

49. The system of claim 38, wherein the network is the Internet and said transport connections are selected from the group consisting of UDP and TCP.

50. The system of claim 49, wherein said transport connections are TCP.

51. The system of claim 38, wherein the network is an ISO compatible network and said transport connections are OSI class 4 transport connections.

52. The system of claim 37, wherein said local and remote emulation modules include a transport layer using protocols conforming to ISO 8073.

53. The system of claim 52, wherein said local and remote emulation said local and remote emulation modules communicate with said transport layer via an ISO 8072 compatible interface.

54. The system of claim 37, wherein said local and remote emulation modules include a TCP transport layer.

55. The system of claim 54, wherein said local and remote emulation modules communicate with said transport layer via a socket interface.

56. The system of claim 37, wherein said local and remote emulation modules include a TCP transport layer, said local module is a TCP server and said remote module is a TCP client.

57. The system of claim 37, wherein said local and remote emulation modules include a TCP transport layer, said local module is a TCP client and said remote module is a TCP server.

58. The system of claim 45, wherein said local emulation module emulates a DCE.

59. The system of claim 46, wherein said remote emulation module emulates a DCE.

60. The system of claim 45, wherein said local emulation module emulates a serial interface.

61. The system of claim 46, wherein said remote emulation module emulates a serial interface.

62. The system of claim 45, wherein said local emulation module emulates a V.34 interface.

63. The system of claim 46, wherein said remote emulation module emulates a V.34 interface.

64. The system of claim 45, wherein said local emulation module emulates a Native Command Language interface between said local emulation module and said local peer.

65. The system of claim 46, wherein said remote emulation module emulates a Native Command Language interface between said remote emulation module and said remote peer.

66. The system of claim 45, wherein said local emulation module emulates a Hayes compatible interface between said local emulation module and said local peer.

67. The system of claim 46, wherein said remote emulation module emulates a Hayes compatible interface between said remote emulation module and said remote peer.

68. The system of claim 37, wherein said connection is supported by a data communications network comprising a wireless connection compatible with the legacy application.

69. The system of claim 68, wherein said data is encrypted when traversing said wireless connection.

70. The system of claim 69, wherein said data is encrypted using an encryption selected from the group consisting of DES, 3-DES, FIPS140-1, RSA and AES.

71. The system of claim 68, wherein said data is compressed when traversing said wireless connection.

72. The system of claim 71, wherein said data is compressed using a compression selected from the group consisting of 3rd-Order Arithmetic, Z-Lib, RLE and LZW.

73. The system of claim 68, wherein said wireless connection is RD-LAP transmitted over GFSK.

74. The system of claim 37, wherein said emulation of a negotiation of a wireless connection comprises emulation of a wireless connection establishment, emulation of a wireless data transfer and emulation of a wireless connection release.

75. The system of claim 37 further comprising a local packet manager and a remote packet manager and wherein said at least one connection between said local emulation module and said remote emulation module is between said local packet manager and a remote packet manager.

76. The system of claim 75 wherein said local packet manager compresses said data prior to transmission to said remote packet manager and wherein said remote packet manager decompresses said compressed data on reception.

77. The system of claim 75 wherein said local packet manager encrypts said data prior to transmission to said remote packet manager and wherein said remote packet manager decrypts said encrypted data on reception.

78. The system of claim 75 wherein said remote packet manager compresses said data prior to transmission to said local packet manager and wherein said local packet manager decompresses said compressed data on reception.

79. The system of claim 75 wherein said remote packet manager encrypts said data prior to transmission to said local packet manager and wherein said local packet manager decrypts said encrypted data on reception.

80. A method for multiplexing data from at least one mobile legacy application with data from at least one mobile IP application, the method comprising the steps of:
   in an emulation module, receiving commands and the data from the mobile legacy application;

said emulation module in response to said commands and the data emulating the negotiation of a wireless connection between the mobile legacy application and a fixed legacy application, said emulation module relaying said data to a packet manager; and said packet manager receiving the data from the at least one IP application and multiplexing the IP application data with the legacy application data.

81. The method of claim 80, wherein said multiplexed data is compressed.

82. The method of claim 81, wherein said multiplexed data is compressed using a compression selected from the group consisting of 3rd-Order Arithmetic, Z-Lib, RLE and LZW.

83. The method of claim 81, wherein said multiplexed data is encrypted.

84. The method of claim 83, wherein said multiplexed data is encrypted using a compression selected from the group consisting of DES, 3-DES, FIPS140-1, RSA and AES.

85. A method for transferring data between at least one local legacy application/remote legacy application pair and data from at least one local IP application/remote IP application pair, the method comprising:

an emulation module, receiving commands and the data from the local legacy application;

said emulation module, in response to reception of said commands and the data, emulating the negotiation of a wireless connection between the local legacy application and the remote legacy application, said emulation module relaying the received data to a local packet manager; and said local packet manager multiplexing the data received from said local emulation module with data received from the at least one local IP application and transferring said multiplexed data to a remote packet manager; and wherein, on reception, said remote packet manager de-multiplexes said multiplexed data and transfers said de-multiplexed data to the appropriate remote legacy application or remote IP application.

86. A system for transferring data between at least one local legacy application/remote legacy application pair and data from at least one local IP application/remote IP application pair, the system comprising:

a local emulation module and a remote emulation for each local legacy application/remote legacy application pair;

a local packet manager and a remote packet manager;

wherein said local emulation modules, in response to reception of commands and data from said local legacy applications, emulating the negotiation of a wireless connection between the local legacy application and the remote legacy application, said emulation module relaying the data to said local packet manager;

wherein said local packet manager multiplexes the data received from said local emulation module with the data received from the at least one local IP application, said local packet manager transferring said multiplexed data to said remote packet manager; and wherein, on reception of said multiplexed data, said remote packet manager de-multiplexes said multiplexed data and transfers said de-multiplexed data to the appropriate remote legacy application or remote IP application.

87. The system of claim 86 wherein said local packet manager compresses said data prior to transmission to said remote packet manager and wherein said remote packet manager decompresses said compressed data on reception.

88. The system of claim 86 wherein said local packet manager encrypts said data prior to transmission to said remote packet manager and wherein said remote packet manager decrypts said encrypted data on reception.

* * * * *